United States Patent Office 3,228,947
Patented Jan. 11, 1966

3,228,947
AMINOPYRAZOLES
Paul Schmidt, Therwil, and Kurt Eichenberger and Max Wilhelm, Basel, Switzerland, assignors to Ciba Corporation, New York, N.Y., a corporation of Delaware
No Drawing. Filed Nov. 21, 1962, Ser. No. 240,198
Claims priority, application Switzerland, Jan. 23, 1962, 787/62
The portion of the term of the patent subsequent to Feb. 16, 1982, has been disclaimed
23 Claims. (Cl. 260—293)

This invention relates to 3-aminopyrazoles which are substituted in the 5-position by a pyridyl-(2) radical, their N-acyl derivatives, quaternary ammonium compounds of these compounds and the salts thereof.

The new compounds may be further substituted in the nuclei. In this connection, for example, substitution in 4-position may be mentioned. Substituents are, for example: lower alkyl radicals, phenyl radicals, which may be substituted, if required, by lower alkyl or alkoxy groups or halogen atoms. Here, as hereinafter, lower alkyl or alkoxy radicals are, in particular, methyl, ethyl, propyl, isopropyl or straight-chain or branched butyl, pentyl, hexyl or heptyl radicals linked in any position and halogen atoms, especially fluorine, chlorine, bromine or the pseudohalogen trifluoromethyl.

In the particular, however, the new compounds may be substituted at the 2-nitrogen atom of the pyrazole ring, preferably by unsubstituted or substituted hydrocarbon radicals, saturated or unsaturated heterocyclic or heterocyclicaliphatic radicals.

Hydrocarbon radicals in 2-position are, for example, saturated or unsaturated aliphatic, alicyclic, alicyclicaliphatic, araliphatic or aromatic hydrocarbon radicals, such as lower straight-chain or branched alkyl or alkenyl radicals, for example methyl, ethyl, propyl, isopropyl radicals and straight-chain or branched butyl, pentyl, hexyl or heptyl radicals linked in any position, allyl or methallyl radicals, cycloalkyl or cycloalkenyl radicals, such as cyclopentyl, cycloheptyl, cyclopentenyl, cyclohexenyl radicals, cycloalkyl alkyl or cycloalkenyl alkyl radicals, such as cyclopentyl or cyclohexenyl methyl, ethyl or propyl radicals, aralkyl or aralkenyl radicals, such as phenylmethyl, phenylethyl, phenylvinyl or phenylpropyl radicals, or aryl, more particularly phenyl, radicals. Heterocyclic or heterocyclic aliphatic radicals are, in particular, mononuclear radicals, such as pyridyl radicals or piperidyl radicals, for example N-alkyl-piperidyl-(4) radicals.

As substitutents of the said aliphatic radicals in 2-position there may be mentioned in particular free or substituted hydroxyl, mercapto or amino groups in which the substituents are preferably of an aliphatic nature and, if desired, may be bound to the aliphatic radical, for example, lower alkoxy, alkylmercapto or mono- or dialkyl-amino or mono- or dicycloalkylamino groups, alkylene-, oxaalkylene-, azaalkylene- or thiaalkylene-amino groups, such as methyl-, ethyl-, propyl-, butyl-, pentyl- or hexyl-oxy or -mercapto groups, methyl-, dimethyl-, ethyl-, diethyl-, propyl-, dipropyl-, N-methyl-N-propyl-, N-methyl-N-cyclopentyl-, butyl-, dibutylamino groups, pyrrolidino, piperidino, morpholino or piperazino groups, for example the piper azino, N-methyl-piperazino or N-hydroxyethyl-piperazino group.

Other substituents which are possible as regards the aliphatic radicals are halogen atoms, such as chlorine or bromine.

The alicyclic radicals in 2-position may carry in particular lower alkyl radicals.

Aromatic or heterocyclic radicals in 2-position may have in particular halogen atoms or the above-indicated alkyl or alkoxy groups, while in the alicyclic-aliphatic, araliphatic or heterocyclic-aliphatic radicals both parts may be substituted as stated.

N-acyl compounds, such as mono- or di-N-acyl compounds, are in particular those which are derived from lower aliphatic, alicyclic, aromatic or heterocyclic acids. There may be mentioned, for example, lower fatty acids, such as acetic acid, propionic acid, butyric acid, pivalic acid or their halo, hydroxy or amino substitution products; cycloalkane-carboxylic acids, such as cyclopentyl- or cyclohexyl-carboxylic acid; cycloalkyl-alkane-carboxylic acids, for example cyclopentylpropionic acid; benzoic acids, which may be substituted if required by lower alkyl or alkoxy groups or halogen atoms; or pyridine carboxylic acids, for example, nicotinic or isonicotinic acid.

Quaternary ammonium derivatives of the new compounds are, in particular, lower alkylammonium or benzylammonium compounds, which latter may be substituted in the nucleus if required.

The new compounds have an anti-inflammatory, antipyretic and anti-allergic action and, if in 2-position they carry an N-alkyl-piperidyl radical, a hypotensive or coronary-dilating action, and accordingly can be used pharmacologically in animals or employed as medicaments, for example in the treatment of inflammatory or allergic processes. They are also valuable intermediate products for the preparation of other compounds which can be employed in particular as pharmaceutics.

Particularly valuable are compounds of the formula

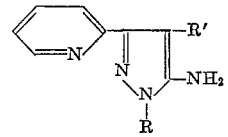

their N-acyl derivatives and salts thereof, in which R represents hydrogen, a lower alkyl hydroxyalkyl, aminoalkyl, mono- or di-lower alkylamino-alkyl, alkyleneimino-alkyl, azaalkyleneimino-alkyl, oxaalkyleneamino-alkyl or cycloakyl radical, for example, one of the abovementioned radicals, or a phenyl radicals which may be substituted, if required, by lower alkyl or alkoxy groups or halogen atoms, or a pyridyl radical, for instance the pyridyl-2 radical or an N-alkyl-piperidyl radical, such as the N-methyl-piperidyl-(4) radical, and R' represents hydrogen or a lower alkyl radical.

Particularly to be mentioned in this connection are compounds of the formula

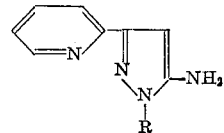

and their salts, in which R signifies a lower alkyl radical, such as methyl, ethyl, propyl, butyl or pentyl, but in particular a propyl, butyl, pentyl or hexyl radical which is branched or not linked in 1-position, a cycloalkyl radical, such as cyclopentyl or cyclohexyl, a phenyl, halophenyl, lower alkoxyphenyl or lower alkylphenyl radical or a pyridyl radical, such as the pyridyl-(2) radical, or an N-alkyl-piperidyl radical, such as the N-methyl-piperidyl-(4) radical.

Mention should be made primarily of 2-sec.-butyl-3-amino-5-pyridyl-(2)-pyrazole and 2-sec.-butyl-3-acetamino-5-pyridyl-(2)-pyrazole and its salts.

The new compounds are obtained by reacting a pyridyl-(2)-ketone having in the α-position with respect to the carbonyl group at least one hydrogen atom and a nitrile group such as a 2-(α-cyano-alkanoyl)-pyridine with a hydrazine having at least three hydrogen atoms.

The reaction is carried out in manner known per se, advantageously in the presence of diluents and, if required, at elevated temperature and/or in the presence of condensing agents, for example strong acids, such as hydrochloric acid, arylsulfonic acids or similar acids.

The aminopyrazoles obtained can be N-acylated in conventional manner, for example with reactive derivatives, such as halides or anhydrides, of the acids mentioned at the beginning, preferably in the presence of the conventional acid-binding condensing agents. Depending on the reaction conditions, for example, reaction temperature on the one hand, and elevated temperature and excess of acylating agent, on the other hand, one or two acyl radicals can be introduced.

4-unsubstituted compounds obtained can readily be halogenated in 4-position, for example by treatment with chlorinating or brominating agents, such as, in particular, elemental chlorine or bromine, or compounds giving off chlorine or bromine. Tertiary amines obtained can be quaternised in manner known per se, for example, by reaction with reactive esters of lower alkanols or benzyl alcohols, such as their halides, sulfonates, or sulfates.

The invention also relates to those embodiments of the process in which a start is made from a compound which can be obtained at any stage as an intermediate product and the missing steps are carried out, or the process is interrupted at any stage, or in which a starting material is produced under the reaction conditions or employed in the form of a salt or quaternary ammonium derivative or N-oxide.

The said reactions are carried out in conventional manner in the presence or absence of diluents, condensing and/or catalytic agents, at reduced, ordinary or elevated temperature, if required in a closed vessel.

The pyridoyl-(2)-acetonitriles employed as starting materials and which may be monosubstituted and their salts are new. They likewise form an object of the invention. These compounds are obtained when a pyridyl-(2)-carboxylic acid ester, such as an alkyl, for example the ethyl, ester is reacted with a possibly monosubstituted acetonitrile.

The other starting materials are known or can likewise be obtained by known methods.

Depending on the reaction conditions and starting materials, the new compounds are obtained in free form or in the form of their salts. The salts of the new compounds can be transformed into the free compounds in manner known per se, for example acid addition salts by reaction with a basic agent. On the other hand, if required, free bases which are obtained can form salts with inorganic or organic acid. To produce acid addition salts, therapeutically usable acids are employed in particular, for example hydrohalic acids, for example hydrochloric acid or hydrobromic acid, perchloric acid, nitric acid or thiocyanic acid, sulphuric or phosphoric acids, or organic acids, such as formic acid, acetic acid, propionic acid, glycollic acid, lactic acid, pyroracemic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicyclic acid, 4-amino-salicyclic acid, 2-phenoxybenzoic acid, 2-acetoxybenzoic acid, methanesulfonic acid, ethanesulfonic acid, hydroxyethanesulfonic acid, benzenesulfonic acid, p-toluenesulfonic acid, naphthalenesulfonic acid or sulfanilic acid, or methionine, tryptophan, lysine or arginine. At the same time, the salts may be mono- or poly-salts.

Quaternary ammonium salts may also be converted into the ammonium hydroxides, for example, by the action of freshly precipitated silver oxide on the ammonium halides, or the action of barium hydroxide solution on the ammonium sulfates, or by using basic ion exchangers, and from the said ammonium hydroxides other ammonium salts can be obtained by reaction with acids, for instance those mentioned above. The said exchange may also take place direct, using suitable ion exchangers.

If the new compounds contain asymmetrical carbon atoms, they may be in the form of racemates or racemate mixtures, which can be separated in conventional manner or decomposed into the antipodes.

The new compounds are intended to be used as medicaments in the form of pharmaceutical preparations containing these compounds together with pharmaceutical, organic or inorganic, solid or liquid carriers suitable for enteral, for example oral, or parenteral administration. For making the carriers there are used substances which do not react with the new compounds, such as, for example, water, gelatine, lactose, starch, magnesium stearate, talc, vegetable oil, benzyl alcohols, gums, polyalkylene glycols, cholesterol or other known carriers for medicaments. The pharmaceutical preparations may be in the form, for example, of tablets, dragees, capsules or in liquid form as solutions, suspensions or emulsions. If desired, they are sterilised and/or contain auxiliary substances, such as preserving, stabilising, wetting or emulsifying agents, salts for changing the osmotic pressure or buffers, they may also contain other therapeutically valuable substances. The new compounds may also be employed in veterinary medicine, for example in one of the above-mentioned forms.

The invention is described in greater detail in the following examples. The temperatures are given in degrees centigrade.

*Example 1*

14.6 grams of pyridoyl-(2-acetonitrile are boiled with 5 grams of hydrazine hydrate in 150 cc. of absolute alcohol for 10 hours under reflux. The reaction solution is treated with carbon and evaporated to dryness. The residue is recrystallized from alcohol with the addition of ether. In this way, 3-amino-5-pyridyl-(2)-pyrazole of the formula

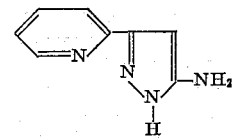

is obtained, the melting point of which is 124–125° C.

*Example 2*

14.6 grams of 2-pyridoyl-(2)-acetonitrile are boiled with 11.3 grams of hydroxyethyl hydrazine monohydrochloride in 180 cc. of absolute alcohol under reflux. The reaction solution is then evaporated to dryness, the partly crystallized residue is dissolved in 2 N-hydrochloric acid, the solution purified with carbon, the filtrate rendered alkaline and extraction with chloroform carried out. The chloroform residue is recrystallized from water and the precipitated crystals are dried for a fairly long time under high vacuum, hydrate-free 2-(β-hydroxyethyl)-3-amino-5-pyridyl-(2)-pyrazole of the formula

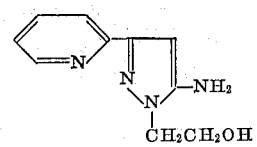

being obtained which, after recrystallization from alcohol-ether, melts at 116–117° C.

*Example 3*

14.6 grams of pyridoyl-(2)-acetonitrile and 9.6 grams of sec.-butyl hydrazine are boiled in 150 cc. of absolute alcohol for 10 hours under reflux. The alcoholic solution is concentrated after purification with carbon until crystallization commences and the precipitated crystals are filtered off with suction. In this way, 2-sec.-butyl-3-amino-5-pyridyl-(2)-pyrazole of the formula

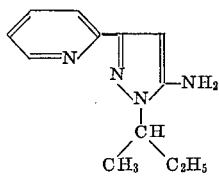

is obtained, the melting point of which is 120–122° C.

The pyridoyl-(2)-acetonitrile employed as starting product is prepared as follows:

250 cc. of absolute alcohol are added slowly drop by drop to 23 grams of sodium in 750 cc. of boiling toluene. After the sodium has dissolved, distilling off is carried out until the boiling point rises to 91° C. The reaction solution is then allowed to cool to 90° C., 100 grams of 2-picolinic acid ethyl ester and 60 grams of acetonitrile are added and the mixture is boiled for 7 hours under reflux. After cooling, water is added and the layer of toluene is separated. After adding 160 cc. of 6 N-hydrochloric acid, the precipitated crystals are filtered off. In this way, pyridoyl-(2)-acetonitrile of the formula

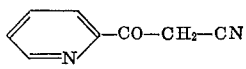

is obtained, the melting point of which is 93–94° C.

Example 4

7.5 cc. of acetic anhydride are added to 10.8 grams of 2-sec.-butyl-3-amino-5-pyridyl-(2)-pyrazole and the whole is allowed to stand for 60 hours at room temperature. The crystalline magma is stirred with 2 N-sodium hydroxide solution, the crystals are suctioned off and recrystallized from a mixture of acetone and petroleum ether. There is obtained 2-sec.-butyl-3-acetylamino-5-pyridyl-(2)-pyrazole of the formula

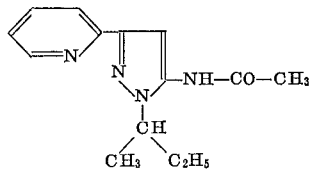

melting at 130–132° C.

Example 5

A solution of 2.3 grams of sodium in 44 cc. of absolute alcohol is added to a solution of 20.2 grams of N-methyl-piperidyl-(4)-hydrazine dihydrochloride in 512 cc. of alcohol of 97.5% strength. The precipitated sodium chloride is suctioned off and the filtrate boiled under reflux with 14.6 grams of pyridoyl-(2)-acetonitrile for 10 hours. The reaction solution is then evaporated in vacuo, the residue dissolved in water, extracted with ether and the aqueous solution rendered alkaline with 2 N-sodium hydroxide solution. The alkaline solution is extracted with chloroform and the chloroform solution evaporated. The residue is recrystallized from ether to yield 2-[N-methyl-piperidyl-(4)]-3-amino-5-pyridyl-(2)-pyrazole of the formula

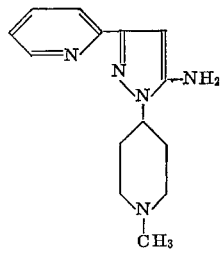

melting at 151–152° C.

11.0 grams of the above described base are dissolved in 30 cc. of absolute alcohol and treated with 53.5 cc. of 0.8 N-alcoholic hydrochloric acid. The reaction mixture is concentrated somewhat and ether is added, whereupon the hydrochloride of 2-[N-methyl-piperidyl-(4)]-3-amino-5-pyridyl-(2)-pyrazole melting at 232–233° C. precipitates.

Example 6

14.6 grams of pyridoyl-(2)-acetonitrile are boiled under reflux for 10 hours with 13.1 grams of β-diethylamino-ethyl-hydrazine in 150 cc. of absolute alcohol. The reaction solution is then evaporated, treated with water and extracted with chloroform. The chloroform extract is dried and evaporated. The radical is recrystallized from ether to yield 2-(β-diethylaminoethyl)-3-amino-5-pyridyl-(2)-pyrazole of the formula

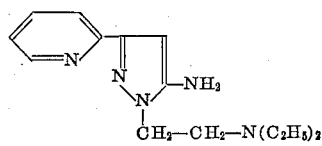

melting at 117–118° C.

Example 7

7.4 grams of 2-secondary butyl-3-amino-5-pyridyl-(2)-pyrazole are heated at 100° C. for 6 hours with 40 cc. of acetic anhydride. The reaction mass is then evaporated under reduced pressure, the radical dissolved in ether, and the solution extracted by shaking with a saturated sodium bicarbonate solution. The ethereal solution is dried and evaporated. The residue is crystallized from a mixture of ether and petroleum ether to obtain the N-diacetyl-2-secondary butyl-3-amino-5-pyridyl-(2)-pyrazole of melting point 105–106 C.

What is claimed is:

1. A compound of the formula

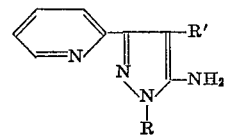

in which R represents a member selected from the group consisting of hydrogen, lower alkyl, hydroxy-lower alkyl, amino-lower alkyl, mono- and di-lower alkylamino-lower alkyl, pyrrolidino-lower alkyl, piperidino-lower alkyl, morpholino-lower alkyl, piperazino-lower alkyl, N-lower alkyl-piperazino-lower alkyl, N-hydroxy-lower alkyl-piperazino-lower alkyl, cyclo-lower alkyl, phenyl, lower alkyl-phenyl, lower alkoxy-phenyl, halogen-phenyl, pyridyl and N-lower alkyl-piperidyl and R' represents a member selected from the group consisting of hydrogen and lower alkyl.

2. An N-lower alkanoyl derivative of a compound claimed in claim 1.

3. A therapeutically useful acid addition salt of a compound claimed in claim 1.

4. A therapeutically useful acid addition salt of a compound claimed in claim 2.

5. 2-secondary butyl-3-amino-5-pyridly-(2)-pyrazole of the formula

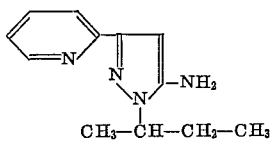

6. A therapeutically useful acid addition salt of the compound claimed in claim 5.

7. 3-amino-5-pyridyl-(2)-pyrazole of the formula

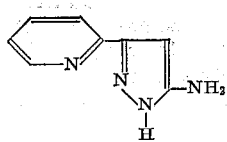

8. A therapeutically useful acid addition salt of the compound claimed in claim 7.

9. 2-β-hydroxyethyl-3-amino-5-pyridyl-(2)-pyrazole of the formula

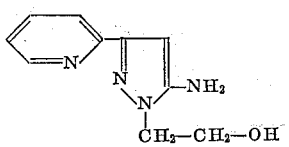

10. A therapeutically useful acid addition salt of the compound claimed in claim 9.

11. 2-secondary butyl-3-acetylamino-5-pyridyl-(2)-pyrazole.

12. A therapeutically useful acid addition salt of the compound claimed in claim 11.

13. 2 - [N-methyl-piperidyl-(4)] - 3-amino-5 - pyridyl-(2)-pyrazole.

14. A therapeutically useful acid addition salt of the compound claimed in claim 13.

15. 2 - (β-diethylamino-ethyl) - 3-amino-5-pyridyl-(2)-pyrazole.

16. A therapeutically useful acid addition salt of the compound claimed in claim 15.

17. N - diacetyl-2-secondary butyl-3-amino-5 - pyridyl-(2)-pyrazole.

18. A therapeutically useful acid addition salt of the compound claimed in claim 17.

19. Pyridoyl-(2)-acetonitrile.

20. 5-pyridyl-(2)-3-aminopyrazoles.

21. A member selected from the group consisting of N-lower-alkanoyl, lower cycloalkanoyl, lower cycloalkyl-lower alkanoyl, benzoyl, lower alkyl-benzoyl, lower alkoxy-benzoyl, halogeno-benzoyl and pyridoyl derivative of a compound claimed in claim 20.

22. A member selected from the group consisting of lower alkylammonium and benzylammonium-quaternary derivative of a compound claimed in claim 20.

23. A therapeutically useful acid addition salt of a compound claimed in claim 20.

References Cited by the Examiner

UNITED STATES PATENTS 2,833,779  5/1958  Fields et al. _____ 260—296
3,041,342  6/1962  Jucker et al. _____ 260—293
3,041,343  6/1962  Jucker et al. _____ 260—294.9

OTHER REFERENCES

Bernthsen et al., "Organic Chemistry," 1941 Edition, pages 681–9 (Blackie).

WALTER A. MODANCE, *Primary Examiner.*

IRVING MARCUS, *Examiner.*